United States Patent
Asada (10) Patent No.: US 7,812,469 B2
(45) Date of Patent: Oct. 12, 2010

(54) BATTERY CURRENT DETECTION APPARATUS INCORPORATED IN SYSTEM WHICH REGULATES VEHICLE ENGINE SPEED AND ELECTRIC GENERATOR OUTPUT VOLTAGE DURING ENGINE IDLING

(75) Inventor: Tadatoshi Asada, Anjo (JP)

(73) Assignee: DENSO CORPORATION, Kariya (JP)

( * ) Notice: Subject to any disclaimer, the term of this patent is extended or adjusted under 35 U.S.C. 154(b) by 513 days.

(21) Appl. No.: 12/000,417

(22) Filed: Dec. 12, 2007

(65) Prior Publication Data

US 2008/0143119 A1  Jun. 19, 2008

(30) Foreign Application Priority Data

Dec. 12, 2006  (JP)  ............................. 2006-333916

(51) Int. Cl.
*H02P 9/48* (2006.01)
*H02J 7/14* (2006.01)

(52) U.S. Cl. ..................... 290/40 B; 290/40 A; 322/24; 322/37; 320/104

(58) Field of Classification Search ............... 290/40 R, 290/40 A, 40 B, 40 C; 322/24, 37, 99; 320/104, 320/134

See application file for complete search history.

(56) References Cited

U.S. PATENT DOCUMENTS

| | | | |
|---|---|---|---|
| 6,625,525 B2* | 9/2003 | Yoshino et al. ............... 701/22 |
| 7,098,628 B2 | 8/2006 | Maehara et al. | |
| 7,285,938 B2* | 10/2007 | Aoyama ...................... 322/28 |
| 7,459,801 B2* | 12/2008 | Shimoyama et al. ...... 290/40 B |
| 7,473,206 B2* | 1/2009 | Obayashi et al. ............ 477/107 |
| 7,571,712 B2* | 8/2009 | Kuroda et al. ............... 123/434 |
| 7,710,068 B2* | 5/2010 | Tani et al. .................... 320/104 |
| 2005/0140342 A1 | 6/2005 | Maehara et al. | |

FOREIGN PATENT DOCUMENTS

| | | |
|---|---|---|
| DE | 10 2004 061 839 A1 | 7/2005 |
| JP | A-05-272379 | 10/1993 |
| JP | A-09-107640 | 4/1997 |
| JP | A-2005-192308 | 7/2005 |

OTHER PUBLICATIONS

Office Action issued in German Patent Application No. 10 2007 058 420.4-45 on Oct. 12, 2009.

* cited by examiner

*Primary Examiner*—Nicholas Ponomarenko
(74) *Attorney, Agent, or Firm*—Oliff & Berridge PLC (57) ABSTRACT

A vehicle system that includes an engine control apparatus which regulates engine idling speed incorporates a battery current detection apparatus which acquires information expressing the value of field current of an engine-driven electric generator and detects a condition of high electrical load as occurrence of a battery discharge current exceeding a threshold value, and responds to that condition by notifying the engine control apparatus of a higher value of field current of the electric generator than the actual value, to thereby effect a rapid increase in engine speed and so rapidly increase the output power of the electric generator.

13 Claims, 8 Drawing Sheets

BATTERY CURRENT DETECTION APPARATUS INCORPORATED IN SYSTEM WHICH REGULATES VEHICLE ENGINE SPEED AND ELECTRIC GENERATOR OUTPUT VOLTAGE DURING ENGINE IDLING

CROSS-REFERENCE TO RELATED APPLICATIONS

This application is based on and incorporates herein by reference Japanese Patent Application No. 2006-333916 filed on Dec. 12, 2006.

BACKGROUND OF THE INVENTION

1. Field of Application

The present invention relates to a control system of a vehicle, which regulates engine speed and electric generator output voltage during engine idling. In particular the invention relates to such a system, incorporating a current detection apparatus which detects a level of current flow of a battery that is charged by output power from the electric generator of the vehicle.

2. Description of Related Art

A control system of a motor vehicle typically includes an engine control apparatus, i.e., engine ECU (electronic control function), one of whose functions is to regulates the engine speed to a specific value during engine idling. Such a system also includes an electric generator control apparatus which regulates the output voltage of the engine-drive electric generator (i.e., combination of an AC generator and rectifier, sometimes referred to as the alternator) that charges the vehicle battery and supplies various electrical loads. The output voltage is regulated by varying the level of field current (excitation current) of the electric generator, by varying the duty ratio of field current pulses, with that duty ratio being referred to in the following as the generation factor. At any specific rotation speed of the electric generator, the level of output power of the generator and the load torque applied to the engine by the generator are each determined by the generation factor. Hence, during engine idling, information expressing the generation factor is transmitted to the engine ECU, i.e., as load torque information.

If a sudden increase in the total electrical load occurs during engine idling, a high level of discharge current flows from the battery, causing a drop in the battery voltage. If the generator control apparatus immediately responds by increasing the generation factor, then the resultant increase in load torque may cause instability of the engine speed, and the engine may stall.

As described for example in Japanese Patent First Publication No. 5-272379 (pages 2-5, FIGS. 1-6), referred to in the following as reference document 1, a type of apparatus is known which detects the generation factor of the electric generator of a vehicle, and controls the rate of intake air flow to the engine during engine idling based on the detected value of generation factor, i.e., the working ratio of the electric generator.

Furthermore as described for example in Japanese Patent First Publication No. 2005-192308 (pages 6-9, FIGS. 1-7), referred to in the following as reference document 2, a type of apparatus is known whereby when an increase occurs in the level of load torque applied to the engine by the electric generator of a vehicle (due to an increase in electrical load), as the engine output power is being increased accordingly, the generation factor of the electric generator is controlled to prevent fluctuations in the battery voltage. After the required level of torque is reached, the engine speed is compared with a predetermined value, and if it is below that value, the generation factor of the electric generator is reduced and is thereafter gradually increased until the required engine speed is reached, thereby preventing excessive variations and overshoot of the engine speed.

Furthermore as described for example in Japanese Patent First Publication No. 9-107640 (pages 3-6, FIGS. 1-11), referred to in the following as reference document 3, a type of apparatus is known whereby when an increase occurs in the electrical load of a vehicle electric generator, the generation factor is controlled to increase in a specific manner, but whereby if the battery voltage should fall below a predetermined threshold value, the generation factor control is halted, i.e., the generation factor is set at 100% (maximum output power is produced by the electric generator).

However in the case of the apparatus of reference document 1, when generation factor control is being applied, it may be incorrectly judged that there is a sufficient level of electrical power being produced by the electric generator, and this may result in a delay in increasing the engine speed as required by an increase in the electrical load on the generator. Furthermore with such an apparatus, fluctuations in engine speed caused by increases in electrical load can be reduced, however no consideration is given to suppressing fluctuations in the battery voltage.

In the case of the apparatus of reference document 2, it is necessary to perform processing for continuously monitoring the engine condition, the battery condition, the electrical load condition, and the electric generator condition. Hence, the data processing load that is imposed on the engine control apparatus (engine ECU) become excessive. In addition, since it is necessary to connect a battery current sensor to the engine control apparatus via a long wiring harness that extends within the engine compartment, high levels of electrical noise may be induced in the wiring harness, resulting in errors in operation.

In the case of the apparatus of reference document 3, since the level of applied electrical load is detected based on the voltage of the battery, the control conditions will change over a long period of time due to change of the internal resistance of the battery. Hence it is difficult to ensure long-term stability of control.

SUMMARY OF THE INVENTION

It is an objective of the present invention to overcome the problems described above. In particular, it is an objective to provide a battery current detection apparatus for installation on a vehicle, whereby when an increase occurs in electrical load during engine idling operation, the engine speed can be increased more rapidly than with a prior art apparatus, while ensuring that changes in engine speed occur in a stable manner while the AC generator is being controlled to respond to the increase in load.

To achieve the above objectives, the invention provides a battery current detection apparatus that is incorporated in a control system of a vehicle, with the control system including an electric generator control apparatus that is connected for communication with the battery current detection apparatus and that regulates the output power of the (engine-driven) electric generator of the vehicle. Specifically, the electric generator control apparatus determines a value of generation factor (i.e., working ratio of the generator, determined by a level of field current that is controlled by a duty ratio of excitation current pulses as described above) and controls the electric generator to operate at that generation factor. The control system also includes an electronic control apparatus that is connected for communication with the battery current detection apparatus and that regulates the idling speed of the vehicle engine in accordance with a specified generation factor value that is transmitted from the battery current detection apparatus.

The battery current detection apparatus includes a current sensing device which detects the level of charging current or discharge current of the battery, and generation factor acquisition circuitry which acquires the value of generation factor that is currently determined by the electric generator control apparatus. In addition, the battery current detection apparatus includes generation factor modification circuitry, for judging when the detected value of current is a discharge current whose level exceeds a predetermined threshold value. It is a characterizing feature of the invention that:

(a) so long as the battery discharge current level does not exceed the threshold value, the battery current detection apparatus transmits the acquired value of generation factor (i.e., most recently acquired value) to the electronic control apparatus, as the specified generation factor, whereas (b) when the threshold value is exceeded, a modified value of generation factor is transmitted to the electronic control apparatus, as the specified generation factor.

Typically, the modified generation factor value corresponds to maximum output power being produced by the electric generator. That is to say, when an excessively high level of discharge current flows from the battery, the electronic control apparatus of the engine is notified (irrespective of the actual generation factor at which the electric generator is operating) that the electric generator is operating in a condition whereby a high level of load torque is imposed on the engine. The electronic control apparatus responds by immediately increasing the engine output power (i.e., on the incorrect assumption of a large increase in load torque), thereby rapidly increasing the rotation speed of the electric generator. Hence, an increased level of current begins to be supplied from the electric generator to the load, thereby replacing the discharge current from the battery.

In that way when a sudden increase in electrical load occurs during engine idling with a consequent high level of discharge current from the battery, the output power generated by the electric generator can be rapidly increased, since an increase in engine power is not delayed until completion of a gradual increase in the generation factor. This enables shortening of an interval in which the battery voltage has become excessively low due to a sudden increase in electrical load and a consequent high level of discharge current from the battery.

The invention has the significant advantage that the electronic control apparatus (ECU) which controls the engine can be configured and can operate in the same manner as in the prior art, i.e., existing components and circuit arrangements can be used without alteration. This is due to the fact that with the present invention, when an excessive flow of battery discharge current occurs, information is transmitted to the electronic control apparatus indicating that a higher level of load torque is being applied to the engine than is actually the case. Hence, the electronic control apparatus controls the engine to produce a level of output power that would maintain the engine idling speed constant if the transmitted information were correct. The effect is a rapid increase in engine speed.

Such a battery current detection apparatus preferably also includes control time determining circuitry for determining a command value of load response control time, with the determined value being transmitted to the electric generator control apparatus. The load response control time is a duration for which the generation factor determined by the electric generator control apparatus is required to gradually increase to a predetermined value.

The duration of the load response control time is preferably set to increase in accordance with increase in the level of battery discharge current. Alternatively, it may be set to increase in accordance with a lowering of the generator rotation speed, or in accordance with a lowering of the rate of change (rate of increase) of the generator rotation speed. As a further alternative, the load response control time Tc may be set to increase in accordance with lowering of the temperature of the battery. It is also possible to set the load response control time value in accordance with a combination of the battery discharge current value and another parameter value (i.e., the generator rotation speed, or the rate of change of the generator rotation speed, or the battery temperature), as described hereinafter referring to specific embodiments.

When the electric generator control apparatus receives such a command value of load response control time, it successively increases the generation factor at which the electric generator operates, at a rate of increase that is based on the received value of load response control time. In that way the rate at which the load torque on the engine increases, after an increase in electrical load during engine idling, can be controlled to ensure that the engine speed will vary in a stable manner.

DESCRIPTION OF PREFERRED EMBODIMENTS

First Embodiment

Figure 1:
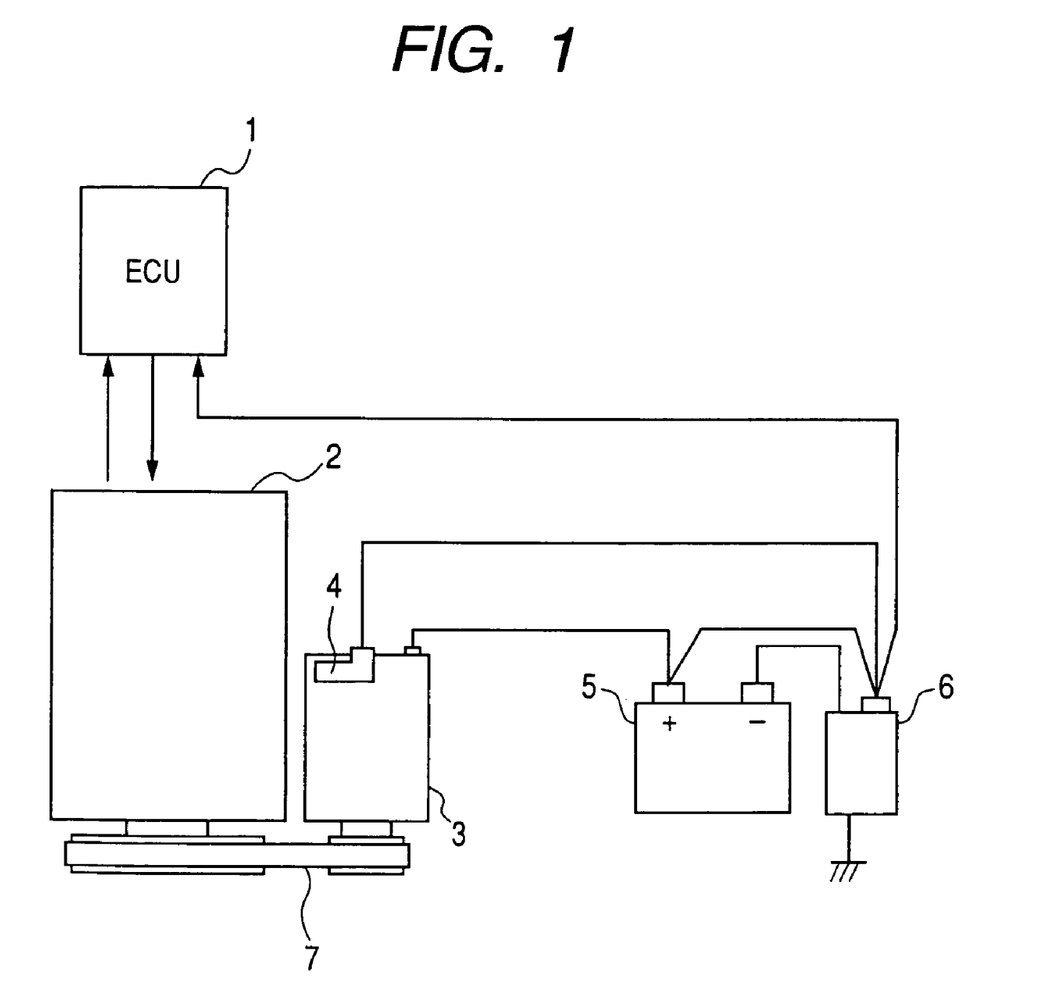
FIG. 1 shows the general configuration of a vehicle-installed system incorporating a battery current detection apparatus according to the present invention.

FIG. 1 shows the overall configuration of a vehicle electrical system including an electric generator 3 for producing electrical power to charge a battery 5 and to supply various electrical loads (not shown in the drawings), with the system incorporating an embodiment of a battery current detection apparatus, designated by reference numeral 6. The system of FIG. 1 includes the vehicle engine 2 which is coupled by a drive belt 7 to the electric generator 3, for driving the electric generator 3 to generate power. Since the invention relates to operation during engine idling, only variations in the torque applied by the engine 2 to drive the electric generator 3 will be considered in the following. The system further includes an ECU 1 which controls the output power of the engine 2, in particular to regulate the engine speed during idling.

The electric generator 3 incorporates a built-in electric generator control apparatus 4 for controlling the output voltage of the electric generator 3 by adjusting an average level of excitation current that is supplied to a field winding of the electric generator 3. As is well known, this is done by adjusting the duty ratio of ON/OFF switching of the field current, to adjust the generation factor at which the electric generator 3 operates.

The battery current detection apparatus 6 is disposed closely adjacent to the battery 5, and performs operations that include measuring the level of charging current or discharge current of the battery 5, as described in detail hereinafter. The battery current detection apparatus 6 may be fixedly attached to the negative terminal of the battery 5, or to a housing of the battery 5.

Figure 2:
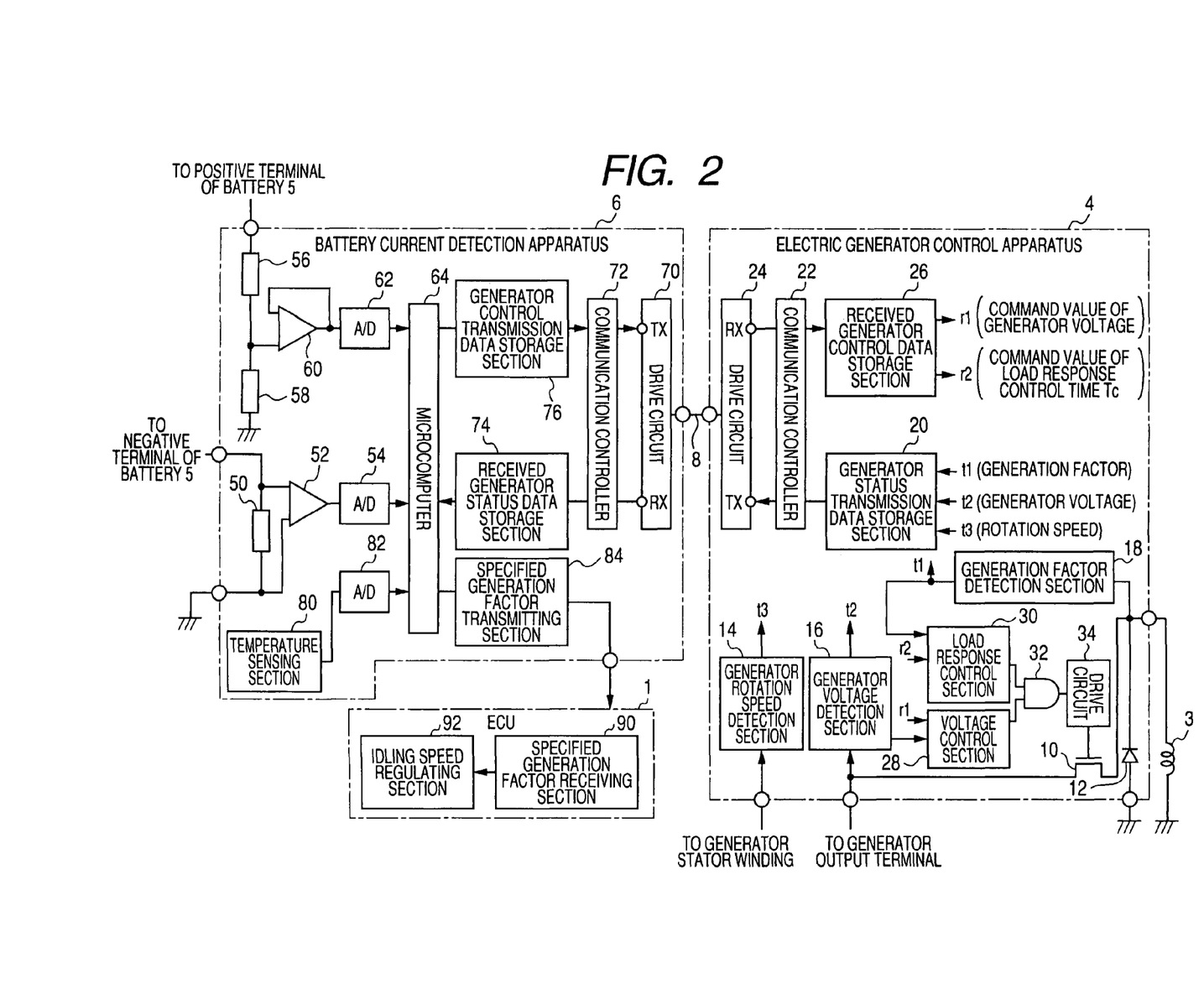
FIG. 2 shows details of the system of FIG. 1.

FIG. 2 shows details of the internal circuit configurations of the battery current detection apparatus 6 and the electric generator control apparatus 4, and illustrates the connection of the battery current detection apparatus 6 to the ECU 1. As shown, the electric generator control apparatus 4 includes a power transistor 10, a return current diode 12, a generator rotation speed detection section 14, a generator voltage detection section 16, a generation factor control section 18, a generator status transmission data storage section 20, a communication controller 22, a drive circuit 24, a received generator control data storage section 26, a voltage control section 28, a load response control section 30, an AND gate 32 and a drive circuit 34.

The power transistor 10 is connected in series with the field winding 3A of the electric generator 3, and is controlled to supply excitation current to the field winding 3A during each of successive intervals in which it is set in an ON (i.e., conducting) state by a control signal applied to a control terminal of the power transistor 10 from the drive circuit 34. A return current diode 12 is connected between the system ground and the junction of the power transistor 10 and the field winding 3A, for passing a return current through the field winding 3A each time that the power transistor 10 is switched to the non-conducting state.

The generator rotation speed detection section 14 receives an AC voltage produced by a phase winding which is part of a stator winding of the electric generator 3, and measures the rotation speed of the electric generator 3 based on the frequency of the AC voltage. The generator voltage detection section 16 detects the level of output voltage produced from the output terminal of the electric generator 3. The generation factor control section 18 detects the generation factor at which the electric generator 3 is operating (i.e., measured as the duty ratio of ON/OFF switching of current to the field winding 3A). With this embodiment, this is performed by detecting the voltage appearing at the junction between the power transistor 10 and the field winding 3A, as shown.

The generator status transmission data storage section 20 stores generator condition transmission data, constituted by detected values of the generation factor (designated as t1), the generator output voltage (t2) and the generator rotation speed (t3), which are respectively detected by the generation factor control section 18, the generator voltage detection section 16 and the generator rotation speed detection section 14. A modulator section of the communication controller 22 performs modulation processing for converting the data values held in the generator status transmission data storage section 20 into an appropriate digital data communication format, with the resultant converted data being transmitted by the drive circuit 24 (as a digital signal) to the electric generator control apparatus 4 via a communication line 8.

In addition the drive circuit 24 includes a receiver section, for receiving digital data constituting modulated received generator control data (which have been converted to the data communication format described above) transmitted from the battery current detection apparatus 6. The communication controller 22 further includes a demodulator section, which performs demodulation processing of such received digital data, with the resultant received generator control data being stored in the received generator control data storage section 26. As shown, the received generator control data include a command value of generator output voltage (r1) and a command value of load response control time (r2).

The command value of generator output voltage and the detected value of generator output voltage that is derived by the generator voltage detection section 16 are each inputted to the voltage control section 28. During steady-state operation (i.e., during engine idling, with no sudden large change in the electrical load of the electric generator 3) an output signal from the voltage control section 28 (i.e., pulse train having a specific duty ratio) is applied to control the drive circuit 34 via the AND gate 32, by regulating the generation factor of the electric generator 3 to maintain the output voltage of the electric generator 3 at the command value of generator output voltage (r1).

When an increase occurs in the level of electrical load that is driven by the electric generator 3, thereby necessitating an increase in the generation factor of the electric generator 3, a command value of load response control time (r2) is transmitted from the battery current detection apparatus 6 to the electric generator control apparatus 4, as an appropriate duration of an interval in which the generation factor is to be gradually increased, to prevent a sudden increase in the load torque on the engine 2. The load response control section 30 uses that value of load response control time and the detected generation factor to produce a control signal (i.e., pulse train having a gradually increasing duty ratio), which is applied to the AND gate 32 for controlling the generation factor to increase at an appropriate rate. The operation of the system while the generation factor is being gradually increased in such a condition will be referred to as load response control operation. The derivation of the command value of load response control time is described hereinafter.

The AND gate 32 obtains the logical product of the respective control signals from the load response control section 30 and the voltage control section 28, and applies a control signal to the drive circuit 34 in accordance with that logical product, and the drive circuit 34 drives the power transistor 10 accordingly. The duty ratio of current pulses supplied to the field winding 3A of the electric generator 3 via the power transistor 10, and hence the generation factor, is thereby controlled in accordance with the control signals from the voltage control section 28 and load response control section 30 during load response control operation.

Other than during load response control operation, the output from the load response control section 30 is held at the logic "1" level of the AND gate 32, so that the output signal from the voltage control section 28 is applied unchanged to the drive circuit 34.

As shown in FIG. 2, the battery current detection apparatus 6 includes a shunt resistor 50, amplifiers 52 and 60, A/D (analog-to-digital) converters 54, 62 and 82, an temperature sensing section 80, resistors 56, 68, a microcomputer 64, a drive circuit 70, a communication controller 72, a generator control transmission data storage section 76 and a specified generation factor transmitting section 84. The level of charging current or discharge current of the battery 5 is detected as a voltage developed across the shunt resistor 50, which is connected between the negative terminal of the battery 5 and the system ground. That voltage is amplified by the amplifier 52, which is a differential amplifier, and the resultant detected value is converted to digital data by the A/D converter 54 and inputted to the microcomputer 64.

The resistors 56, 58 constitute a resistive voltage divider, connected between the positive terminal of the battery 5 and the system ground. The battery (terminal) voltage is thereby voltage-divided and the resultant detected battery voltage is transferred through the amplifier 60 (which is connected as a unity-gain buffer amplifier circuit) and converted to digital data by the A/D converter 62, to be inputted to the microcomputer 64.

The temperature sensing section 80 detects the temperature of the battery 5, and produces an output voltage in accordance with the detected temperature, with the value of that voltage being converted to digital data by the A/D converter 82, and inputted to the microcomputer 64.

The drive circuit 70 and communication controller 72 in combination serve to transmit and receive digital signals conveying data that are transmitted between the electric generator control apparatus 4 and the battery current detection apparatus 6 via the communication line 8, i.e., perform the same functions as for the communication controller 22 and drive circuit 24 of the electric generator control apparatus 4. When a digital communication signal conveying the modulated generator condition transmission data described above is received by the drive circuit 70, the signals is transferred to the communication controller 72 to be demodulated. The resultant received generator status data are then held in the received generator status data storage section 74, to be available to the microcomputer 64. When generator condition transmission data are outputted by the microcomputer 64 and set into the generator control transmission data storage section 76, the data are then subjected to modulation processing by the communication controller 72, to be converted to the aforementioned digital data communication format, with the resultant converted digital data being transmitted by the drive circuit 70 to the electric generator control apparatus 4 via the communication line 8.

The microcomputer 64 extracts the generation factor value from the received generator status data that are currently held in the received generator status data storage section 74, and (as described in the following) either supplies that generation factor value directly to the specified generation factor transmitting section 84, to be transmitted to the ECU 1 via a communication line, or supplies a predetermined large value of generation factor (with this embodiment, 100%) to the specified generation factor transmitting section 84, to be transmitted to the ECU 1. In either case, the transmitted value will be referred to as the "specified generation factor" in the following.

As shown in FIG. 2, the ECU 1 includes a specified generation factor receiving section 90 and an idling speed regulation section 92. The specified generation factor receiving section 90 receives the specified generation factor value from the specified generation factor transmitting section 84 of the battery current detection apparatus 6, and supplies it to the idling speed regulation section 92. The idling speed regulation section 92 applies that value of generation factor in controlling the output power of the engine to maintain the idling speed at a constant level, i.e., to increase the engine power in accordance with any increase in the specified generation factor.

Figure 3:
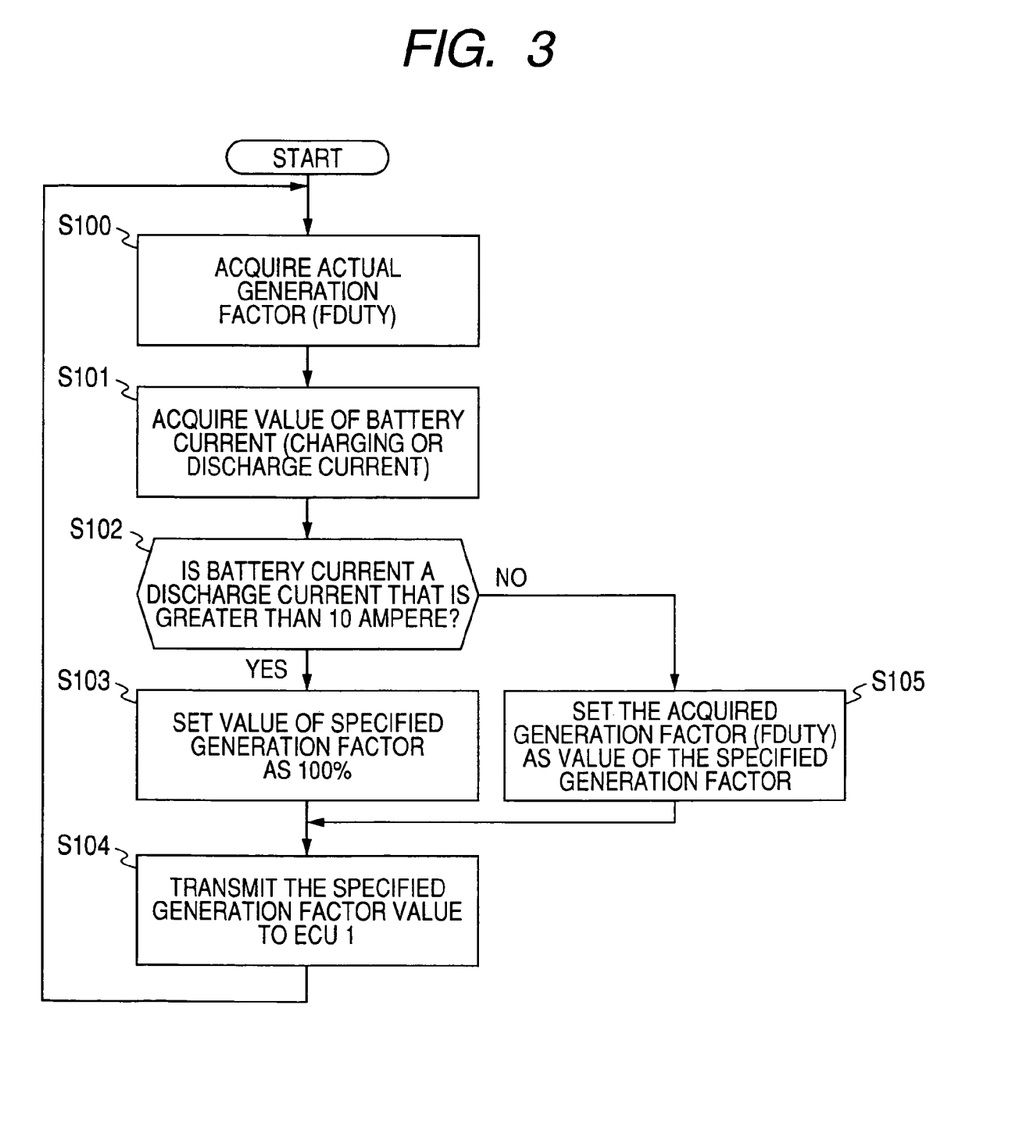
FIG. 3 is a flow diagram of an operation sequence executed for transmitting a specified generation factor value.

The operation of this embodiment will be described in the following. FIG. 3 is a flow diagram of an operating sequence relating to the generation factor that is successive performed by the microcomputer 64 of the battery current detection apparatus 6, at periodic intervals (e.g., a period that is one tenth of the time constant of the rotor of the electric generator 3).

When a set of generator status data are received from the electric generator control apparatus 4 by the drive circuit 70 (conveyed as part of a communication data frame, whose format is described hereinafter) and demodulated by the communication controller 72, and temporarily stored in the received generator status data storage section 74, the demodulated data include the detected value of generation factor, designated as FDUTY, the detected value of rotation speed of the electric generator, designated as N_ALT, and the detected value of generator output voltage, designated as Vb. In the operating sequence shown in FIG. 3, the microcomputer 64 first acquires from the received generator status data storage section 74 the generation factor FDUTY from the (most recently stored) demodulated generator status data held in the received generator status data storage section 74 (step S100). The microcomputer 64 then acquires the currently detected value of battery current IBATT, obtained via the A/D converter 54 (step S101).

The microcomputer 64 then judges (in step S102) whether the value IBATT represents a discharge current flowing from the battery (i.e., judges whether IBATT is a negative value). If IBATT is a discharge current, the microcomputer 64 then judges whether the (absolute) value of IBATT is greater than 10 A. If so, a YES decision is made and step S103 is then executed, while if not, step S105 is then executed.

The threshold value of current used in the judgement of step S102 is preferably made less than the level of operating current of the air conditioner apparatus of the vehicle. With this embodiment it is assumed that this operating current is 15 A, so that the judgement threshold value is set as 10 A.

In step S103, the specified generation factor value that is to be transmitted to the ECU 1 is set at 100% (i.e., representing a maximum level of power being generated by the electric generator 3), and in the succeeding execution of step S104 that specified generation factor value is transmitted to the ECU 1.

However if there is a NO decision in step S102 then step S105 is executed, so that the most recently updated actual value (FDUTY) of the generation factor of the electric generator 3 (obtained from the electric generator control apparatus 4 as described above and read out from the received generator status data storage section 74) is transmitted to the ECU 1 as the specified generation factor value, in step S104.

It should be noted that it is not essential that the generation factor value FDUTY be set as high as 100% in step S103.

With this embodiment, as in the prior art, when there is a sudden increase in the level of electrical load driven by the electric generator thereby causing a high discharge current flow from the battery 5 and corresponding drop in the battery voltage, the generation factor is then increased only gradually. When such an electrical load increase occurs, then initially, the ECU 1 acquires the successively increasing (actual) values of generation factor, as successively transmitted specified generation factor values (i.e., each resulting from execution of steps S105, S104 of FIG. 3) and gradually increases the engine output power accordingly, to balance the gradually increasing generator torque. Hence, the engine speed increases only gradually. In the prior art, this condition of gradual increase is continued until the generator output voltage reaches a sufficiently high level. Hence that there is a significant delay before the battery voltage recovers to its previous value.

However with the present invention when such a sudden increase in electrical load occurs, causing the battery discharge current to exceed the predetermined threshold value (with this embodiment, 10 A), then instead of notifying the ECU 1 of the actual (gradually increasing) values of generation factor being applied by the electric generator 3, the information transmitted by the battery current detection apparatus 6 to the idling speed regulation section 92 of the ECU 1 specifies a predetermined large value of generation factor (with this embodiment, 100%). In response, the ECU 1 quickly increases the level of engine output power. However since the actual generation factor at that time is smaller than the value notified to the ECU 1 (so that only a relatively low load torque is being applied by the electric generator 3 at that time), the engine speed becomes substantially increased.

The generator output power thereby rapidly increases, so that a charging current flows into the battery and the battery voltage is rapidly restored to its previous level, with a minimum of delay.

In addition to determining an appropriate value of output voltage of the electric generator 3, to be transmitted to the electric generator control apparatus 4 as the aforementioned command value of generator voltage (r1), the microcomputer 64 periodically derives and transmits the aforementioned command value of load response control time (r2). to the electric generator control apparatus 4. With this embodiment, it will first be assumed that the load response control time is calculated based upon the level of charging current or discharge current of the battery and the engine speed, in combination. In that case, a load response control time value Tc is derived in each of periodic executions of the operation sequence shown in FIG. 5. This sequence may be executed in parallel with that of the operation sequence of FIG. 3 above, or may be executed in each interval between successive executions of the operation sequence of FIG. 3.

Figure 5:
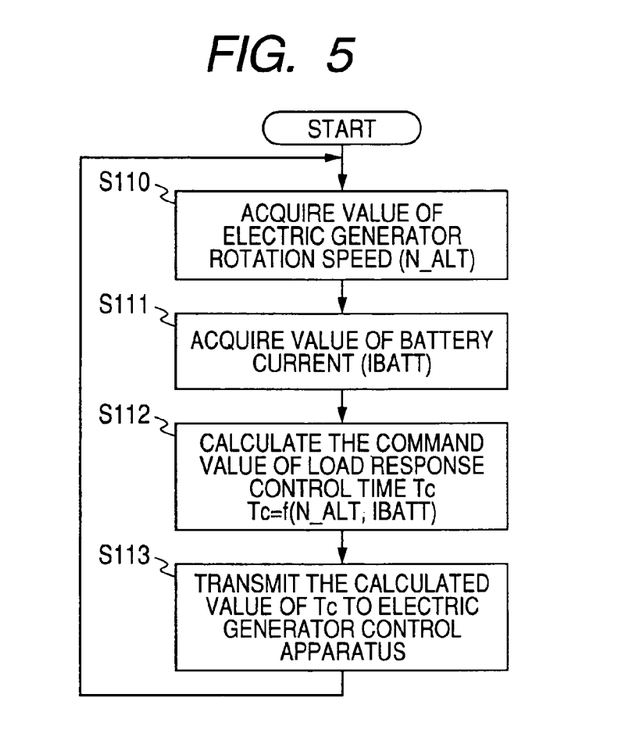
FIG. 5 is a flow diagram of an example of an operation sequence executed for deriving and transmitting command values of a load response control time, utilized in a first embodiment.

In FIG. 5, firstly in step S110 the microcomputer 64 acquires (from the generator status data currently held in the received generator status data storage section 74) the rotation speed N_ALT of the electric generator 3, then similarly acquires the level of charging current or discharge current IBATT of the battery 5 (step S111). The command value of load response control time Tc is then derived (step S112) as a function of N_ALT and IBATT. The command value Tc is then transmitted to the battery current detection apparatus 6 as part of the generator control transmission data described above (step S113).

Figure 6:
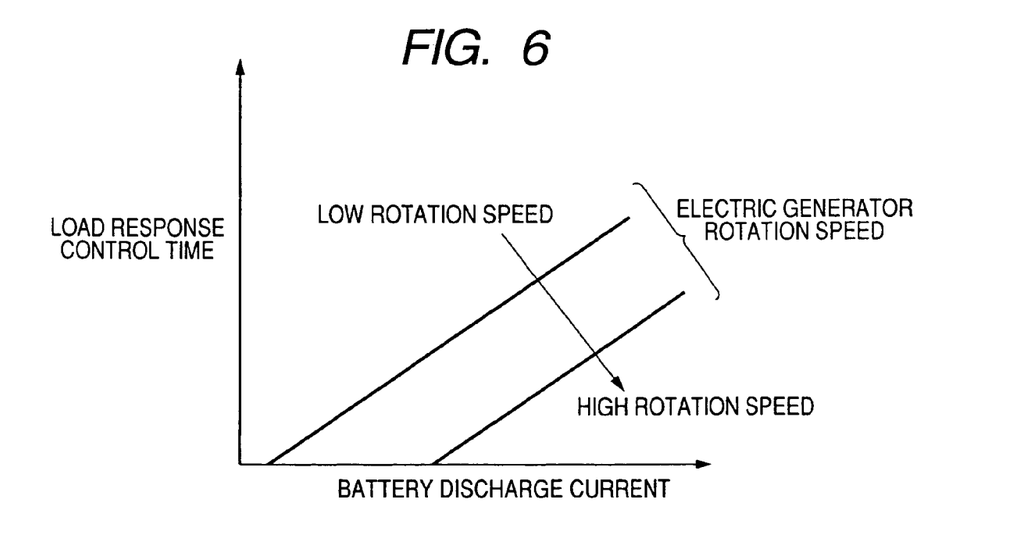
FIG. 6 is a graph illustrating relationships between load response control time, electric generator rotation speed, and battery discharge current, with the first embodiment.

FIG. 6 illustrates the relationship between values of the load response control time Tc, the battery discharge current, and the generator rotation speed. As shown, Tc increases in accordance with increase in the level of discharge current and decrease in the generator rotation speed.

The load response control time value can be derived in step S112 by calculation using an equation, or could be derived by readout from a stored table which relates various combinations of values of N_ALT and IBATT to corresponding load response control command values, with the parameter relationships being as shown in FIG. 6.

The operation of this embodiment will be further described referring to the timing diagrams of FIGS. 4A to 4D, in which FIG. 4A shows an example of ideal variation of engine speed (i.e., as would occur if there were no delay in engine response to control that is effected by the ECU 1), FIG. 4B shows the variation in electrical load, for the case of a sudden large increase in the electrical load, FIG. 4C shows the variations in generator output current, FIG. 4D shows the actual variations in engine speed, and FIG. 4E shows the variations in battery terminal voltage. The full-line portions in FIGS. 4A to 4D apply to the present invention, while the broken-line portions illustrate the manner of variation in the case of the prior art, i.e., as would be the case if the ECU 1 were to be notified only of the actual (true) values of generation factor after a sudden large increase in the electrical load.

Figure 4:
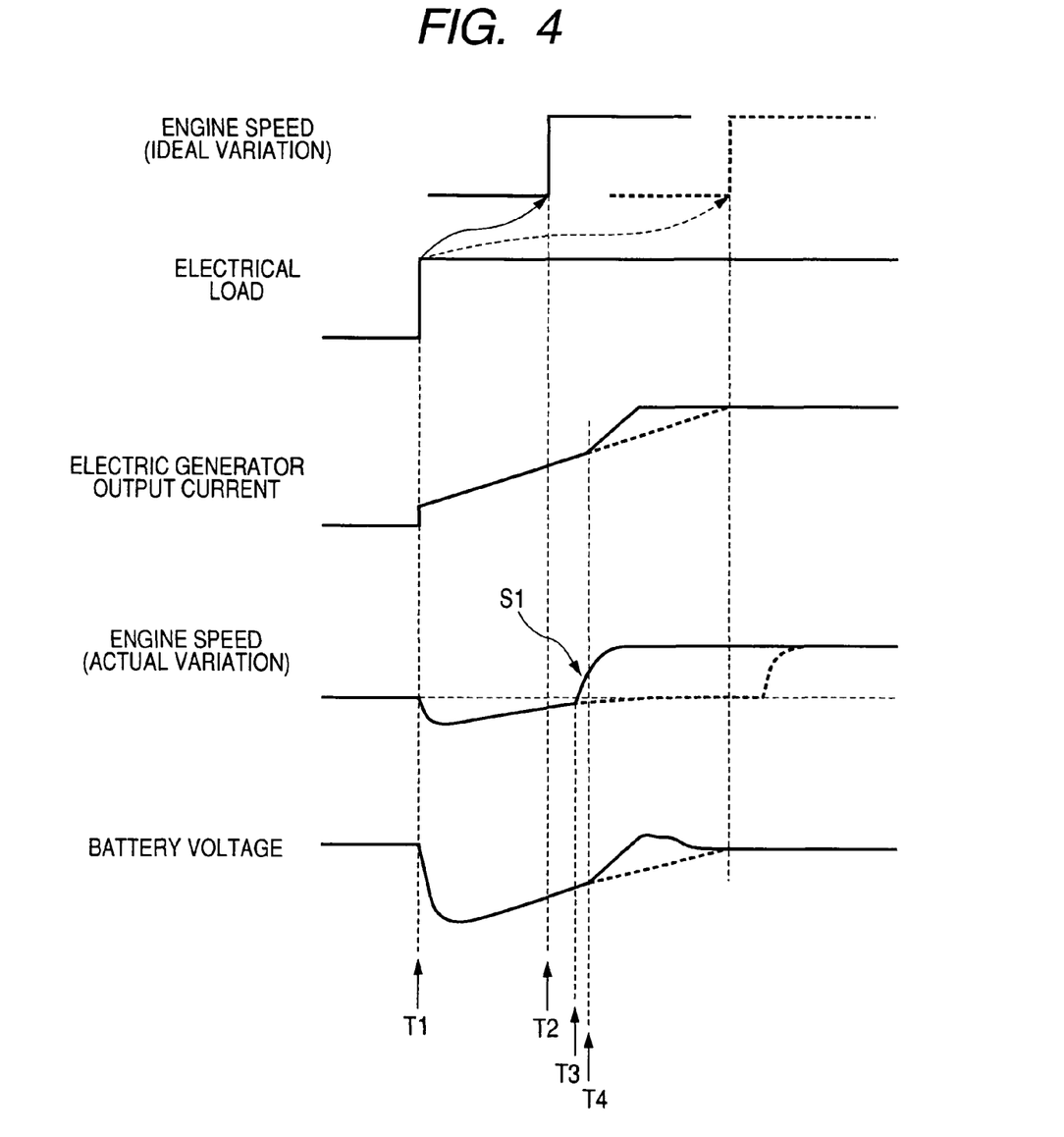
FIG. 4 is a timing diagram for describing the operation of the system of FIG. 1.

In FIG. 4:

(1) Prior to the time point T1, in each execution of the operation sequence of FIG. 3 it is judged that the battery 5 is not supplying a discharge current exceeding the threshold value (10A), and so the actual value of generation factor of the electric generator 3 is transmitted from the battery current detection apparatus 6 to the ECU 1. Hence, the idling speed regulation section 92 controls the engine power based on that actual value of generation factor, in regulating the engine to a specific idling speed. Also at this time, in each execution of the operation sequence of FIG. 5 it is judged that the combination of values of N_ALT and IBATT corresponds to a load response control time Tc value of zero, and that value is transmitted to the electric generator control apparatus 4. Hence, the load response control section 30 does not produce a control signal for modifying the generation factor of the electric generator 3 (specifically, it produces an output fixed at the logic "1" level of AND gate 32) so that the generation factor is determined only by the control signal from the voltage control section 28. Thus the generator output voltage is regulated to the command value of voltage (r1) that is supplied to the voltage control section 28 (transmitted from the battery current detection apparatus 6).

(2) In an execution of the operation sequence of FIG. 5 following the load increase at time point T1, it is judged that the combination of values of N_ALT and IBATT corresponds to a specific non-zero value of load response control time Tc, and that value of Tc is transmitted to the electric generator control apparatus 4 and inputted to the load response control section 30. Based on Tc, and the actual generation factor at that time, the load response control section 30 calculates a value of rate of increase of the generation factor, and controls the generation factor to increase accordingly.

(3) Subsequently at time point T2, in an execution of the operation sequence of FIG. 3, it is judged that the battery current IBATT is a discharge current and that it exceeds the threshold value (10A). Hence, instead of transmitting the actual generation factor, the microcomputer 64 transmits information to the ECU 1 specifying that the electric generator 3 is operating at a generation factor of 100%. As a result, the ECU 1 applies engine control for substantially increasing the engine output power.

(4) Thus at time point T3, the engine power becomes increased to a higher value than is required to maintain the engine at the regulated idling speed, and hence the engine speed (and generator rotation speed) begins to rapidly increase.

(5) Subsequently at time point T4, in an execution of the operation sequence of FIG. 5, it is judged that the engine speed has reached a specific level S1 which (in combination with the attained level of battery current) corresponds to a load response control time Tc zero, and that command value of load response control time is transmitted to the load response control section 30. Hence, the load response control section 30 ceases to control the generation factor, which is now controlled only by the voltage control section 28. Thus (since the electric generator output voltage at this time is lower than the command value) the generation factor becomes rapidly increased in accordance with the control signal from the voltage control section 28. The generator output current thereby begins to rapidly increase after time point T4, and charging current thus begins to flow to the battery 5. The generator output voltage is thereby rapidly restored to the command value and the battery voltage is accordingly restored.

It can thus be understood that with this embodiment, when a sudden increase in electrical load occurs during engine idling, resulting in a high level of discharge current from the battery 5, while the generation factor of the electric generator 3 begins to be controlled to increase only gradually in order to prevent sudden application of a high load torque on the engine 2, the invention enables the engine speed to be rapidly increased, without delaying until the generation factor reaches a high value at the end of an interval of gradual increase. Thus the invention enables a reduction of the duration of an interval in which current is discharged from the vehicle battery to supply the increased electrical load, and hence a shortening of the interval in which the battery voltage is excessively low.

Furthermore, it will be apparent that with the present invention, it is not necessary to alter the mode of operation of the ECU 1 from a prior art mode of operation, since there is no change in the way in which the ECU 1 controls the engine idling speed, i.e., based on information which the ECU 1 receives (purportedly) specifying the rate at which the electric generator is working, and hence (purportedly) indicating the load torque that must be applied by the engine to drive the electric generator at a regulated idling speed.

Moreover, detection of a sudden increase in electrical load is performed based upon detecting the level and direction of current flow of the battery 5. Thus, long-term variations in the internal resistance of the battery 5 will have no adverse effect upon the operation. Hence the invention is advantageous by comparison with prior art methods which are based on monitoring the terminal voltage of the battery for detecting a condition of high discharge current due to an increase in electrical load.

With the above embodiment, the threshold value of discharge current of the battery 5 is set lower than the operating current of the vehicle air conditioner apparatus. This ensures that the ECU 1 can rapidly respond to changes in torque load on the engine 2 due to variations in the operating condition of the air conditioner apparatus, so that the engine idling speed can be held stable.

The above embodiment has been described assuming that after a sudden increase in electrical load, the battery current detection apparatus 6 derives successive values of the load response control time Tc (i.e., in successive executions of the operation sequence of FIG. 5) which are respectively applied by the load response control section 30 in determining the rate of increase of the generation factor of the electric generator 3, with that rate being successively updated until the received values of Tc become zero. However it would be equally possible to configure the embodiment such that after a sudden increase in electrical load occurs, and a first value of Tc is thereafter transmitted to the electric generator control apparatus 4, the rate of increase of the generation factor is thereafter based only on that initial value of Tc, so that the rate of increase is held fixed. This increase would be continued until a zero value for Tc is obtained in an execution of the operation sequence of FIG. 5 as described above, with that value being then transmitted to the electric generator control apparatus 4, for terminating the load response control interval.

Second Embodiment

Figure 7:
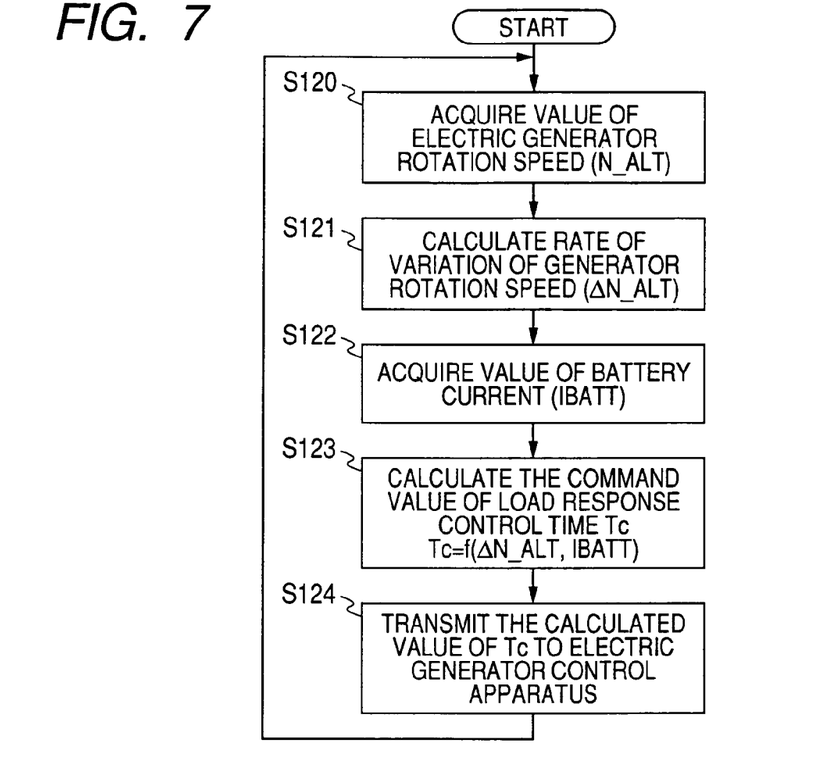
FIG. 7 is a flow diagram of a second example of an operation sequence executed for deriving and transmitting command values of load response control time, with a second embodiment.

A second embodiment will be described in the following. This differs from the first embodiment only with respect to the manner in which the microcomputer 64 of the battery current detection apparatus 6 derives each value of load response control time Tc, so that only the points of difference from the first embodiment will be described. With the second embodiment, the periodically executed operation sequence of FIG. 7 replaces the operation sequence of FIG. 5 described above for the first embodiment. Only the features of difference from the first embodiment will be described. In FIG. 7, steps S120, S122, S123, S124 respectively correspond to steps S110, S111, S112, S113 of FIG. 5. As shown in FIG. 7, with the second embodiment, after acquiring the electric generator rotation speed N_ALT in step S120, the rate of change ΔN_ALT of that rotation speed is calculated in step S121. Specifically, each newly acquired (updated) value of N_ALT obtained in an execution of the operation sequence of FIG. 7 is temporarily stored. In executing step S120, the most recently stored value of N_ALT is subtracted from the currently acquired value of N_ALT. If the sign of the difference is negative, this indicates that the subtraction result ΔN_ALT represents a rate of decrease in speed, while a positive sign indicates a rate of increase of speed.

In step S123, the command value of load response control time Tc is calculated, based on a combination of the rate of change of generator rotation speed ΔN_ALT and the value of battery charging current or discharge current IBATT that is acquired in step S122. Next, in step S124, the derived value of load response control time Tc is transmitted to the battery current detection apparatus 6, as part of the generator control transmission data.

Figure 8:
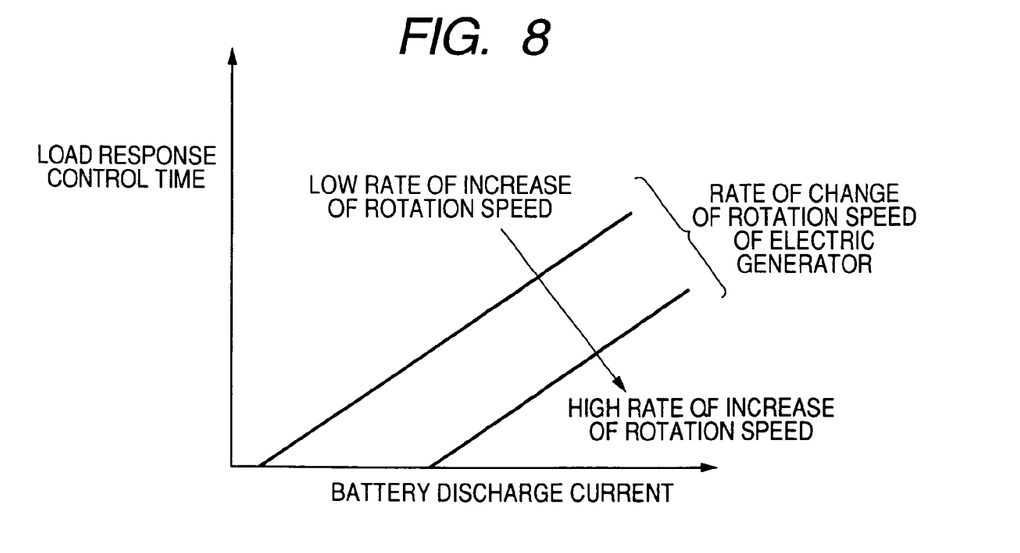
FIG. 8 is a graph illustrating relationships between load response control time, rate of change of electric generator rotation speed, and battery discharge current, utilized with the second embodiment.

FIG. 8 illustrates the relationship between values of the load response control time Tc, the battery discharge current IBATT, and the rate of change of generator rotation speed ΔN_ALT. As shown, the load response control time Tc increases in accordance with increase in the level of battery discharge current and with decrease in the rate of increase of the generator rotation speed.

The load response control command value can be derived in step S123 by calculation using an equation, or by readout from a stored table which relates various combinations of values of ΔN_ALT and IBATT to corresponding values of the load response control time Tc, with the parameter relationships being as shown in FIG. 6.

When an increase occurs in the (total) electrical load driven by the electric generator 3, and the amount of load torque of the electric generator 3 increases accordingly, the speed of the engine 2 can change only gradually (more specifically, the engine speed can increase only gradually). With this embodiment, when discharge current is being drawn from the battery 5 and the rate of increase of speed of the engine 2 becomes low, the duration of the load response control time Tc is made long, so that the torque load imposed on the engine 2 by greater levels of output electrical power from the electric generator 3 increases only gradually. Hence with this embodiment, the engine speed can be controlled to vary in a stable manner, with reduced possibility of stalling of the engine 2 as a result of a sudden increase in electrical load. In addition as described for the first embodiment, while the generation factor of the electric generator 3 is being controlled to increase only gradually, the engine speed can be rapidly increased (when the battery discharge current is detected to be below the above-described threshold value) to thereby rapidly increase the output current from the electric generator 3, without delaying until the generation factor reaches a high value at the end of an interval of gradual increase.

Third Embodiment

Figure 9:
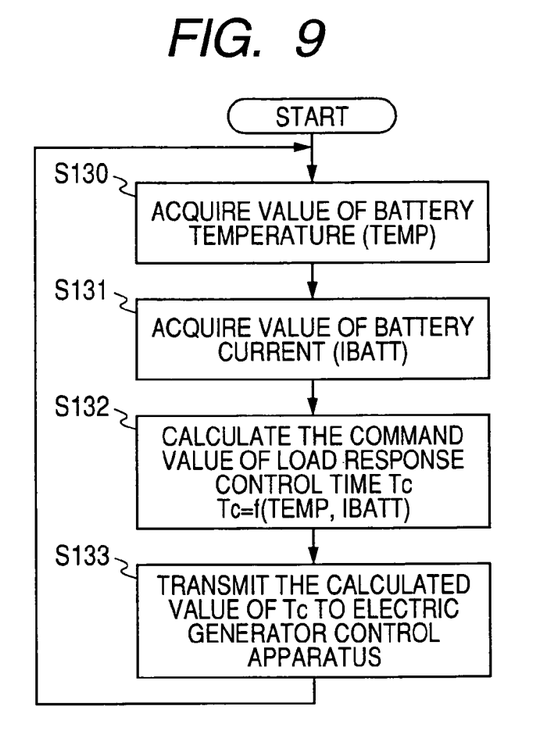
FIG. 9 is a flow diagram of an example of an operation sequence executed for deriving and transmitting command values of a load response control time, with a third embodiment.

A third embodiment will be described in the following. This differs from the first embodiment only with respect to the manner in which the microcomputer 64 of the battery current detection apparatus 6 derives each value of load response control time Tc, so that only the points of difference from the first embodiment will be described. With the third embodiment, the periodically executed operation sequence of FIG. 9 replaces the operation sequence of FIG. 5 of the first embodiment. Only the features of difference from the first embodiment will be described. In FIG. 9, steps S131 and S133 respectively correspond to steps S111 and S113 of FIG. 5. As shown in FIG. 9, firstly in step S130 the battery temperature value TEMP detected by the temperature sensing section 80 is obtained as digital data from the A/D converter 82. The microcomputer 64 then acquires the level of charging current or discharge current IBATT of the battery 5 (step S131).

In step S132, the command value of load response control time Tc is derived based on a combination of the battery temperature value TEMP and the value of battery charging current or discharge current IBATT. In step S133, the derived value of load response control time Tc is transmitted to the battery current detection apparatus 6, as part of the generator control transmission data.

Figure 10:
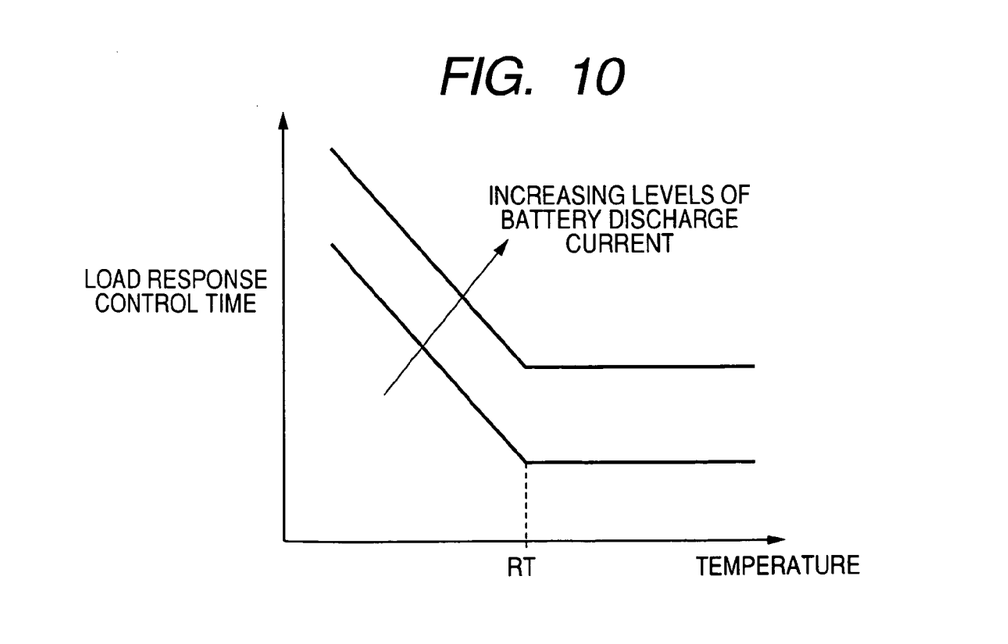
FIG. 10 is a graph illustrating relationships between load response control time, detected values of battery temperature, and battery discharge current, with the third first embodiment.

FIG. 10 illustrates the relationship between values of the load response control time Tc, the battery discharge current IBATT and the battery temperature value TEMP. As shown, at any specific value of battery discharge current, so long as the battery temperature is lower than a predetermined value RT, the command value of load response control time Tc is reduced in accordance with lowering of the battery temperature, while Tc is held constant if the battery temperature is higher than RT. In addition, Tc is increased in accordance with increase of the battery discharge current level.

The load response control time can be derived in step S132 by calculation using an equation, or by readout from a stored table which relates various combinations of values of battery temp and battery current to corresponding values of the load response control time Tc, with the parameter relationships being as shown in FIG. 10.

When the battery temperature of a vehicle is low, then this signifies that the temperature of the electric generator is also low. In that condition, when the electric generator must produce a high level of output power due to an increase in electrical load, the amount of load torque on the engine becomes high. Hence with this embodiment, in such a condition, the duration of the load response control time Tc is increased so that the generation factor of the electric generator 3 will be increased only gradually, Hence the engine speed can be controlled to vary in a stable manner, with reduced possibility of stalling caused by a sudden increase in electrical load during engine idling. In addition as described for the first embodiment, during an interval in which the generation factor of the electric generator 3 is being controlled to increase only gradually, the engine speed can be rapidly increased to thereby rapidly increase the output current from the electric generator 3, without delaying until the generation factor reaches a high value at the end of the interval of gradual increase.

Figure 11:
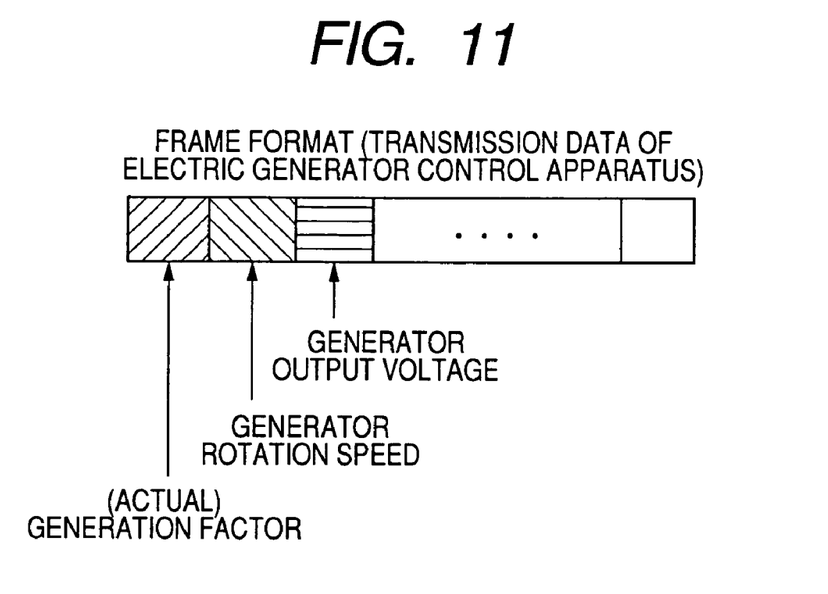
FIG. 11 illustrates a frame format in which data are transmitted from an electric generator control apparatus to a battery current detection apparatus, in the system of FIG. 1; and, FIG. 12 illustrates a frame format in which data are transmitted from the battery current detection apparatus to the electric generator control apparatus.

FIG. 11 illustrates a frame format in which sets of transmission data (i.e., data frames) are transmitted as a digital signal from the electric generator control apparatus 4 to the battery current detection apparatus 6. As shown, respective sections of a frame are allocated to data expressing the generation factor FDUTY, data expressing the generator rotation speed N_ALT, and data expressing the generator output voltage Vb.

Figure 12:
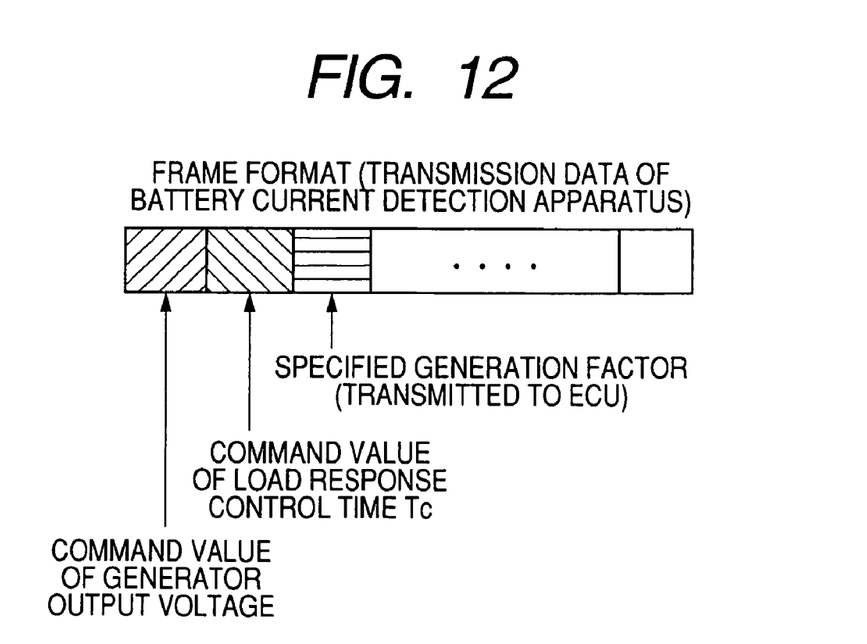

FIG. 12 similarly illustrates a frame format in which data frames are transmitted from the battery current detection apparatus 6 to the electric generator control apparatus 4 and to the ECU 1. As shown, respective sections of a frame are allocated for data expressing the command value of generator output voltage, data expressing the load response control time Tc, data expressing the command value of generator voltage, and data expressing the specified value of generation factor (the latter to be received only by the ECU 1). With each of the above embodiments, the same frame format is used for transmitting data from the battery current detection apparatus 6 to the electric generator control apparatus 4 and also to the ECU 1, with only the data that are actually required by the receiving apparatus being set into the corresponding section of a frame. Thus for example a frame that is transmitted from the battery current detection apparatus 6 to the ECU 1 would contain only the specified value of generation factor.

However it would be equally possible to transmit a common data frame, containing the same sets of data, from the battery current detection apparatus 6 to the electric generator control apparatus 4 and also to the electric generator control apparatus 4. In that case, the received generator control data storage section 26 of the electric generator control apparatus 4 could be configured to extract only the generator output voltage command value and the load response control time data from a received frame, while similarly the specified generation factor receiving section 90 of the ECU 1 could be configured to extract only the data expressing the specified value of generation factor from a received frame. In that case, if the operation sequences of FIG. 3 and FIG. 5 are performed in succession, a specified value of generation factor that is to be transmitted in such a common data frame could be temporarily held in the generator control transmission data storage section 76 (after it is derived in an execution of the operation sequence of FIG. 3), to be inserted in the data frame after the next execution of the operation sequence of FIG. 5.

With respect to the appended claims, the drive circuit 70, the communication controller 72 and the generator control transmission data storage section 76 in combination correspond to the generation factor acquisition circuitry and to the rotation speed acquisition circuitry respectively recited in the claims, while the drive circuit 70, the communication controller 72 and the received generator status data storage section 74 in combination correspond to the control time transmitting circuitry recited in the claims. The combination of the resistor 50, the amplifier 52, and the A/D converter 54 corresponds to the current sensing device recited in the claims, the specified generation factor transmitting section 84 corresponds to the specified generation factor transmitting circuitry recited in the claims, the microcomputer 64 corresponds to the generation factor modification circuitry, control time determining circuitry, and rotation speed acquisition circuitry, respectively recited in the claims. The temperature sensing section 80 and the A/D converter 82 in combination correspond to the temperature sensing device recited in the claims.

It should be noted that the invention is not limited to the above embodiments, and that various modifications or alternative configurations could be envisaged which would fall within the scope of the appended claims.

What is claimed is:

1. A battery current detection apparatus incorporated in a control system of a vehicle, said vehicle control system comprising
   an electric generator control apparatus for regulating an electric generator driven by an engine of said vehicle, said electric generator control apparatus being adapted to determine a value of a generation factor of said electric generator and control said electric generator to operate at said generation factor, and being coupled for communication with said battery current detection apparatus, and
   an electronic control apparatus coupled for communication with said battery current detection apparatus and adapted to regulate an idling speed of an internal combustion engine of said vehicle in accordance with a specified generation factor;
   wherein said battery current detection apparatus comprises:
   a current sensing device adapted to detect a value of charging current or discharge current of said battery;
   generation factor acquisition circuitry adapted to acquire said value of generation factor determined by said electric generator control apparatus;
   generation factor modification circuitry adapted to judge when said detected value of current is a discharge current having a magnitude which exceeds a predetermined threshold value; and
   specified generation factor transmitting circuitry for transmitting said acquired value of generation factor to said electronic control apparatus, as said specified generation factor, when said magnitude of discharge current does not exceed said threshold value, and for transmitting to said electronic control apparatus a value that is greater than said acquired value of generation factor, as said specified generation factor, when said magnitude of discharge current exceeds said threshold value.

2. A battery current detection apparatus as claimed in claim 1, wherein said modified generation factor is a fixedly predetermined value.

3. A battery current detection apparatus as claimed in claim 2, wherein said modified generation factor is a maximum generation factor value.

4. A battery current detection apparatus as claimed in claim 1, wherein said threshold value is less than a value of operating current of an air conditioner apparatus of said vehicle.

5. A battery current detection apparatus as claimed in claim 1, comprising
   control time determining circuitry adapted to determine a command value of load response control time as a duration for which said generation factor determined by said electric generator control apparatus is required to increase to a predetermined value, and
   control time transmitting circuitry for transmitting said command value of load response control time to said electric generator control apparatus,
   said electric generator control apparatus being adapted to successively increase said generation factor determined thereby, at a rate of increase that is based on said command value of load response control time;
   wherein said control time determining circuitry is adapted to increase said command value of load response control time in accordance with increase of said detected value of discharge current.

6. A battery current detection apparatus as claimed in claim 1, comprising
   rotation speed acquisition circuitry for acquiring a rotation speed of said electric generator,
   control time determining circuitry adapted to calculate a rate of increase of said rotation speed, and to determine a command value of a load response control time as a duration for which said generation factor determined by said electric generator control apparatus is required to increase to a predetermined value, and
   control time transmitting means for transmitting said command value of load response control time to said electric generator control apparatus,
   said electric generator control apparatus being adapted to successively increase said generation factor determined thereby, at a rate of increase that is based on said command value of load response control time;
   wherein said control time determining circuitry is adapted to increase said load response control time in accordance with lowering of said rate of increase of rotation speed.

7. A battery current detection apparatus as claimed in claim 1, comprising
   rotation speed acquisition circuitry for acquiring a value of rotation speed of said electric generator,
   control time determining circuitry adapted to determine a command value of a load response control time as a duration for which said generation factor determined by said electric generator control apparatus is required to increase to a predetermined value, and
   control time transmitting means for transmitting said command value of load response control time to said electric generator control apparatus,
   said electric generator control apparatus being adapted to successively increase said generation factor determined thereby, at a rate of increase that is based on said command value of load response control time;
   wherein said control time determining circuitry is adapted to increase said command value of load response control time in accordance with lowering of said rotation speed value.

8. A battery current detection apparatus as claimed in claim 1, comprising
   a temperature sensing device adapted to detect a temperature value of said battery,
   control time determining circuitry adapted to calculate a rate of increase of said rotation speed, and to determine a command value of a load response control time as a duration for which said generation factor determined by said electric generator control apparatus is required to increase to a predetermined value, and
   control time transmitting means for transmitting said command value of load response control time to said electric generator control apparatus,
   said electric generator control apparatus being adapted to successively increase said generation factor determined thereby, at a rate of increase that is based on said command value of load response control time;
   wherein said control time determining circuitry is adapted to increase said command value of load response control time in accordance with lowering of said detected temperature value.

9. A battery current detection apparatus as claimed in claim 1, comprising
rotation speed acquisition circuitry for acquiring a value of rotation speed of said electric generator,
control time determining circuitry adapted to determine a command value of load response control time as a duration for which said generation factor determined by said electric generator control apparatus is required to increase to a predetermined value, and
control time transmitting means for transmitting said command value of load response control time to said electric generator control apparatus,
said electric generator control apparatus being adapted to successively increase said generation factor determined thereby, at a rate of increase that is based on said command value of load response control time;
wherein said control time determining circuitry is adapted to derive said command value of load response control time as a function of said detected value of discharge current and said value of rotation speed, in combination.

10. A battery current detection apparatus as claimed in claim 1, comprising
rotation speed acquisition circuitry for acquiring a value of rotation speed of said electric generator,
control time determining circuitry adapted to calculate a rate of increase of said rotation speed and to determine a command value of load response control time as a duration for which said generation factor determined by said electric generator control apparatus is required to increase to a predetermined value, and
control time transmitting means for transmitting said command value of load response control time to said electric generator control apparatus,
said electric generator control apparatus being adapted to successively increase said generation factor determined thereby, at a rate of increase that is based on said command value of load response control time;
wherein said control time determining circuitry is adapted to derive said command value of load response control time as a function of said detected value of discharge current and said rate of increase of rotation speed, in combination.

11. A battery current detection apparatus as claimed in claim 1, comprising
a temperature sensing device adapted to detect a temperature value of said battery,
control time determining circuitry adapted to calculate a rate of increase of said rotation speed, and to determine a command value of a load response control time as a duration for which said generation factor determined by said electric generator control apparatus is required to increase to a predetermined value, and
control time transmitting means for transmitting said command value of load response control time to said electric generator control apparatus,
said electric generator control apparatus being adapted to successively increase said generation factor determined thereby, at a rate of increase that is based on said command value of load response control time;
wherein said control time determining circuitry is adapted to derive said command value of load response control time as a function of said detected value of discharge current and said detected temperature value, in combination.

12. A battery current detection apparatus as claimed in claim 11, wherein said current sensing device and said temperature sensing device are respectively located at positions close to said battery.

13. A battery current detection apparatus as claimed in claim 11, wherein said transmitting of said specified generation factor to said electronic control apparatus and said transmitting of said command value of load response control time to said electric generator control apparatus are respectively executed by digital data communication.

* * * * *